United States Patent Office 3,458,272
Patented July 29, 1969

3,458,272
AZO DYESTUFFS, MIXTURES OF AZO DYESTUFFS AND PROCESS FOR DYEING THEREWITH
Lester N. Stanley, Delmar, and William H. Armento, Albany, N.Y., assignors to General Aniline & Film Corporation, New York, N.Y., a corporation of Delaware
No Drawing. Filed Mar. 1, 1965, Ser. No. 436,373
Int. Cl. D06p 1/04; C09b 29/00
U.S. Cl. 8—26    13 Claims

ABSTRACT OF THE DISCLOSURE

A dyestuff and method of dyeing polyester condensation polymers therewith, wherein said dyestuff is selected from the group consisting of:

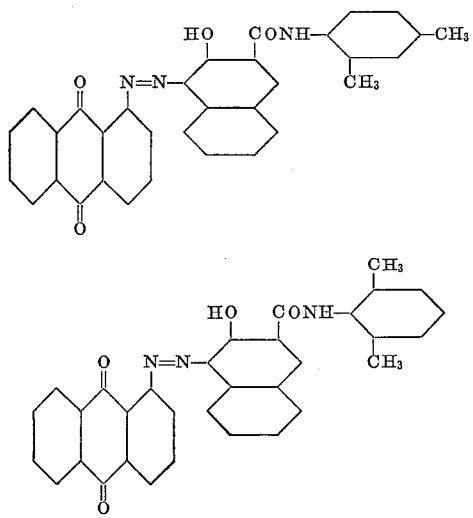

and mixtures of the same.

---

This invention relates to improved anthraquinone azoic pigments and relates more particularly to new azo-dyestuffs and processes for utilizing the same in the coloring of articles, particularly filamentary textile articles including at least a portion of fibers of a polyester condensation product such as polyethylene terephthalate.

Polyester condensation products are among the most difficult synthetic articles to color effectively, particularly textile material formed of polyethylene terephthalate and the like or blends of the same. Although the present invention is useful for coloring of articles made from polymeric polyesters, in the textile art such products have generally been limited to polyethylene terephthalate, that is, the poly-condensation products of di-acids with di-alcohols specifically, terephthalic acid with ethylene glycol. Commercially, such material is available under the trade names "Dacron," "Tergal," and "Terylene."

In addition to textile materials formed entirely of polyesters, the dyestuffs of the instant invention are especially valuable for use with mixed polyester-cotton materials and similar blends.

One general procedure useful for the coloring of polyesters is the "Thermosol" technique described in the American Dyestuff Reporter, 42, pages 1 and 2 (1953). In this process the dyestuff is formed into a paste dispersion which is padded onto the filamentary article, the article is dried and then subjected to elevated temperatures of 390 to 440° F. for from one half to two minutes, to fully develop the color and finished in the conventional manner.

When polyester or mixed polyester-cotton materials have been dyed heretofore, especially by the "Thermosol" process, the resultant product has been subject to various disadvantages such as poor light fastness and sublimation. Additionally, it has been difficult with prior art composition to produce pastel shades or shading colors for oranges, violets, blacks and the like where only small concentrations are utilized.

It is a primary object of this invention to provide dyestuff compositions and procedures particularly adapted for use with polyester and polyester-cotton blends which are free from the foregoing, and other, disadvantages.

Another important object of this invention is the provision of a dye material which will produce a strong, bright scarlet red coloration of good build up having desirable fastness to both light and sublimation.

A further objective of this invention is to provide an azoic dyestuff which is relatively simple and inexpensive to manufacture utilizing well known prior art techniques.

Yet another objective of this invention is the provision of a dyestuff composition which may be utilized in a relatively simple manner to color polyester articles effectively with a minimum of fading of the product after extended subjection to light.

Other and further objects reside in the specific characteristics of the dyestuff compositions and the manipulative steps of the procedures for its use.

Still other objects will in part be obvious and in part be pointed out as the description of the invention proceeds.

Consistent with the above objectives, a dyestuff composition in accordance with the instant invention has the following structural formula:

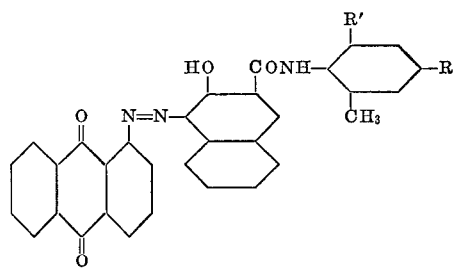

wherein one of R and R' is hydrogen and the other is methyl. Effectively, the dyestuff composition is selected from the group consisting of

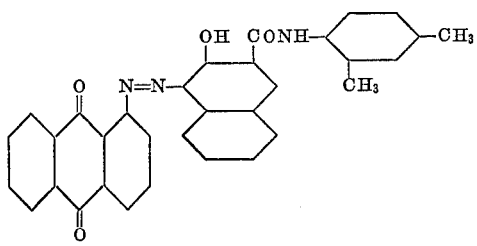

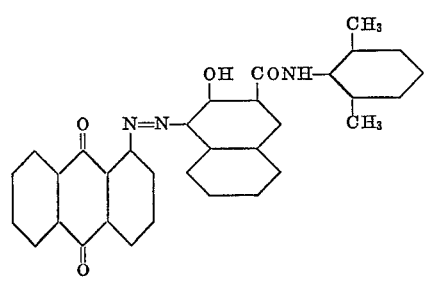

and mixtures of the same.

When used to color polyester or mixed polyester-cotton material, particularly by the "Thermosol" process, the dyes, either in their pure form or as an admixture of the two, produce strong, bright scarlet coloration having good build up and surprising fastness to light and sublimation. Even after extended exposure in a fadeometer such as 90 hours, only a very slight fading is encountered. Further, in a conventional sublimation test, substantially no sublimation occurs even in the case of exceptionally heavy dyeings.

The dyestuffs of the instant invention possess a combination of properties which very few red coloring materials have particularly for polyester articles. These dyestuffs are especially useful in the production of pastel shades or as a shading material in the production of various other colors where only relatively small quantities are utilized.

Production of these dyestuffs is relatively simple and may be realized by following the general method of U.S. Patent No. 2,871,234 to Bergstrom wherein anthraquinone azoic pigments are prepared by oxidation of the leuco sulfuric acid ester of an anthraquinone azoic dye in the presence of a small amount of polymeric N-vinyl-α-pyrrolidone. In the preparation of the instant dyestuff, the leuco sulfuric acid ester of 1-aminoanthraquinone is diazotized and coupled with 3-hydroxy-2-naphtho-2',4'- or 2',6'- or a mixture of 2',4'- and 2',6'-dimethylanilide followed by oxidation to the anthraquinone azoic dye, or they may be made by direct diazotization of 1-aminoanthraquinone and coupling with the arylide.

The dye powder is then treated with dispersing agents in the manner of the preparation of dispersed acetate dyes to provide a dispersible dye. For use in this "Thermosol" process, a 20% active dispersed paste is preferably employed in order to preclude specking of the product which may occur with the use of a dispersed powder. However, powder dispersions may be utilized with proper precautions.

Basically, the procedure is carried out utilizing approximately a 20% active dispersed paste of the dyestuff dispersed in water at concentrations of from about 1–15 ounces a gallon and thickened to suitable padding consistency. Adjuvants in the form of surfactants, carriers or the like my be added, if desired. The polyester or mixed polyester-cotton material is padded with the composition at from about 140 to about 180° F. The padded material is dried and heated at from about 390 to 440° F. for approximately one half to two minutes and finished in a conventional manner.

In order to better understand the instant inventive concept, the following examples are set forth, which examples are to be considered merely as exemplary and not limiting.

EXAMPLE 1

A dye of the formula:

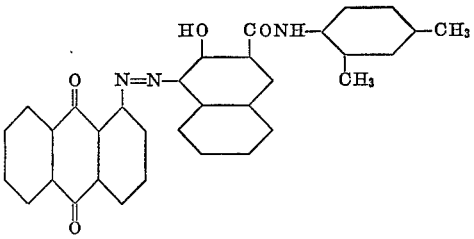

is prepared by adding 23 grams of 1-aminoanthraquinone diazonium sulfate to approximately 650 cc. of water and dissolving the same at about 40° C. followed by clarification utilizing activated charcoal. To this solution was added ice to lower the temperature to below 20° C. and 0.5 gram of polyoxyethylated oleyl alcohol produced by condensing 1 mole of oleyl alcohol with 20 moles of ethylene oxide, the polyoxyethylated oleyl alcohol having been previously dissolved in about 50 cc. of water. Into this mixture was slowly run a solution at 30° C. consisting of about 290 cc. water, 35 cc. of 40% by volume sodium hydroxide, 29 grams of 3-hydroxy-2-naphtho-2',4'-dimethylanilide and 28 grams of sodium acetate. The reaction mixture was adjusted to a pH of 5.5 and stirred overnight while maintaining the temperature at below 20° C. The product was then heated for one hour at 60° C., filtered and washed neutral with hot water.

The dye was dispersed in a conventional manner to 40% activity with sodium ligninsulfonate in a Werner-Pfleider mixer.

One ounce of this dye was dissolved in one gallon of water and then thickened to padding consistency with 0.2 ounce of gum tragacanth and 0.1 ounce of anionic naphthalenesulfonate dispersing agent.

A 5½ x 18 inch piece of "Dacron" polyester fiber was padded with the above at 160° F. and dried. This material was subjected to a temperature of 425° F. for 1½ minutes. The material was then soaped for 5 minutes at the boil, rinsed and dried.

A strong red dyeing of good build-up and exceptional light fastness and sublimation fastness was obtained.

EXAMPLE 2

The procedure of Example 1 was repeated except that a "Dacron"-cotton fabric (65–35) was employed.

A level, strong red dye of the "Dacron" portion was obtained which, once again, had excellent light fastness and outstanding sublimation fastness.

EXAMPLE 3

The procedure of Example 1 was again repeated employing 3-hydroxy-2-naphtho-2',6'-dimethylanilide as a coupler.

The dyeing results were commensurate with those of Example 1.

EXAMPLE 4

The procedure of Example 1 was again repeated employing a mixture consisting essentially of 3-hydroxy-2-naphtho-2',4'-dimethylanilide with a minor amount of 3-hydroxy-2-naphtho-2',6'-dimethylanilide as a coupler.

Once again, results commensurate with those of Example 1 were realized.

EXAMPLE 5

Comparison tests were made with chemically related dyes to show the advantages of the materials of the instant invention. At a concentration of one ounce of 40% active dispersed dye per gallon of padding paste, applied to a "Dacron" fiber by the "Thermosol" process, the following results were obtained:

| Dye | Comments |
|---|---|
| [Anthraquinone-N=N- naphthol with CONH-cyclohexyl bearing R' and R, CH3 substituents] | Fading break very slight at 90 hours; no sublimation. | wherein one of R and R' is hydrogen and the other is methyl.

| Dye | Comments |
|---|---|
| [Anthraquinone-N=N-naphthol with HO, COOCH3] | Fading break slight at 40 hours; slight stain on sublimation test. |
| [Anthraquinone-N=N-naphthol with HO, CONH-cyclohexyl] | Fading break slight at 35 hours; slight stain on sublimation test. |
| [Anthraquinone-N=N-cyclohexyl with HO and CH3] | Fading break pronounced at 40 hours; heavy stain on the sublimation test. |

It will now be seen that there are herein provided improved dyestuff compositions and procedures for their use, particularly in the coloring of polyester materials, which satisfy all of the objectives of the instant invention, and others, including many advantages of great practical utility.

Since many embodiments may be made of the instant inventive concept, and since many modifications may be made of the embodiments hereinbefore described, it is to be understood that all matter herein is to be interpreted merely as illustrative and not in a limiting sense.

What is claimed is:
1. A composition of matter comprising a dyestuff selected from the group consisting of

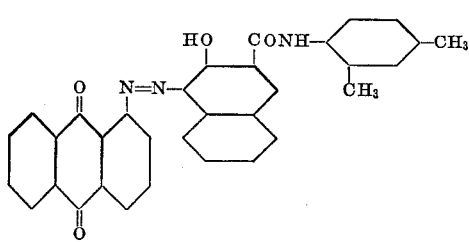

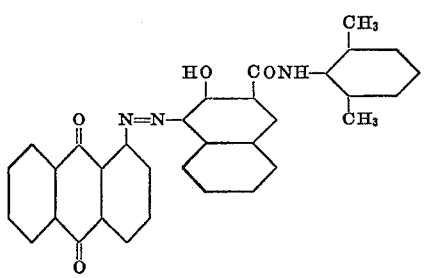

and mixtures of the same.

2. A composition of matter comprising a dyestuff of the formula

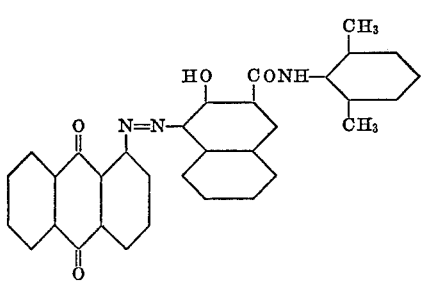

3. A composition of matter comprising a dyestuff of the formula

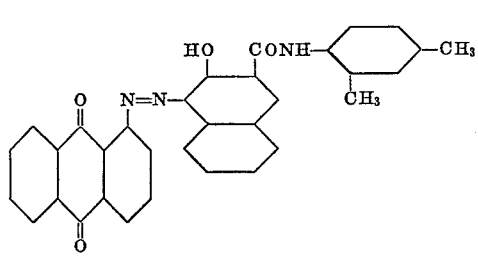

4. A process for the dyeing of an article composed of a polyester condensation polymer comprising contacting said article at an elevated temperature with a dispersion of a dyestuff selected from the group consisting of

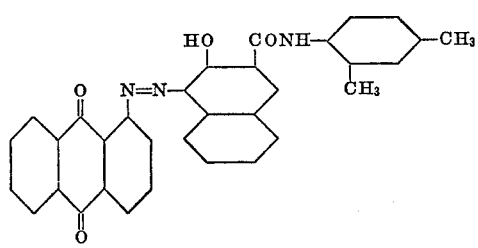

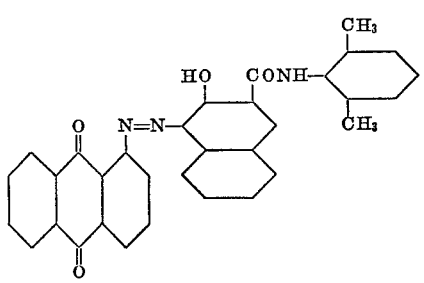

and mixtures of the same

5. A process in accordance with claim 4 wherein said dyestuff is of the formula

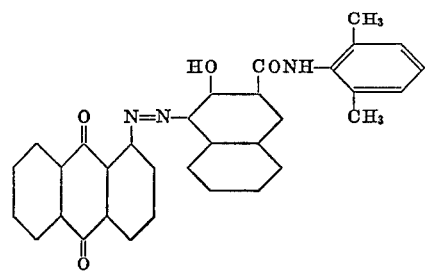

6. A process in accordance with claim 4 wherein said dyestuff is of the formula

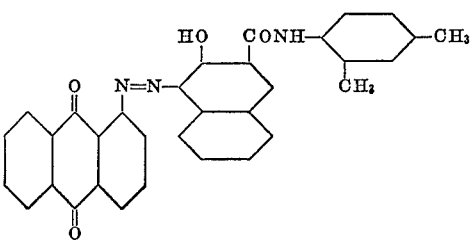

7. A process in accordance with claim 4 wherein said article is a filamentary article.

8. A process in accordance with claim 4 wherein said polyester condensation product is polyethylene terephthalate.

9. A process for the dyeing of a textile material including at least a portion of fibers of a polyester condensation product comprising contacting said textile material at a temperature of from 140–180° F. with an aqueous dispersion of approximately a 20% active dispersed paste at concentrations of about 1–15 ounces per gallon of a dyestuff selected from the group consisting of

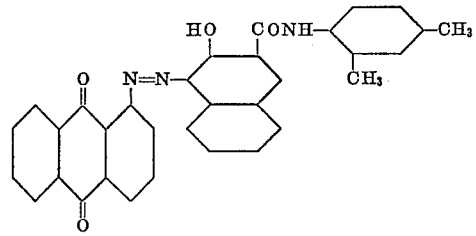

and mixtures of the same, drying said textile material and subjecting said textile material to a temperature of from about 390–440° F. for approximately ½ to 2 minutes.

10. A process in accordance with claim 9 wherein said dyestuff is of the formula

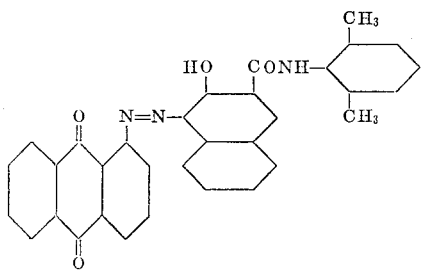

11. A process in accordance with claim 9 wherein said dyestuff is of the formula

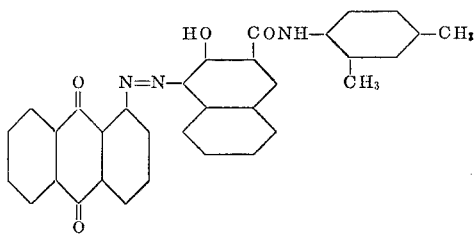

12. A process in accordance with claim 9 wherein said textile material is substantially all fibers of a polyester condensation product.

13. A process in accordance with claim 9 wherein said textile material is a blend of polyethylene terephthalate and cotton fibers.

References Cited
UNITED STATES PATENTS

| | | | |
|---|---|---|---|
| 2,871,234 | 1/1959 | Bergstrom | 260—162 |
| 2,884,410 | 4/1959 | Randall | 8—39 X |
| 3,164,438 | 1/1965 | Thomas | 8—55 X |
| 3,212,841 | 10/1965 | Stanley | 8—39 |

GEORGE F. LESMES, Primary Examiner

T. J. HERBERT, Jr., Assistant Examiner

U.S. Cl. X.R.

8—39, 41, 55; 260—192